Aug. 8, 1950   J. S. BUCHANAN   2,517,970
REAMING TOOL
Filed July 30, 1946
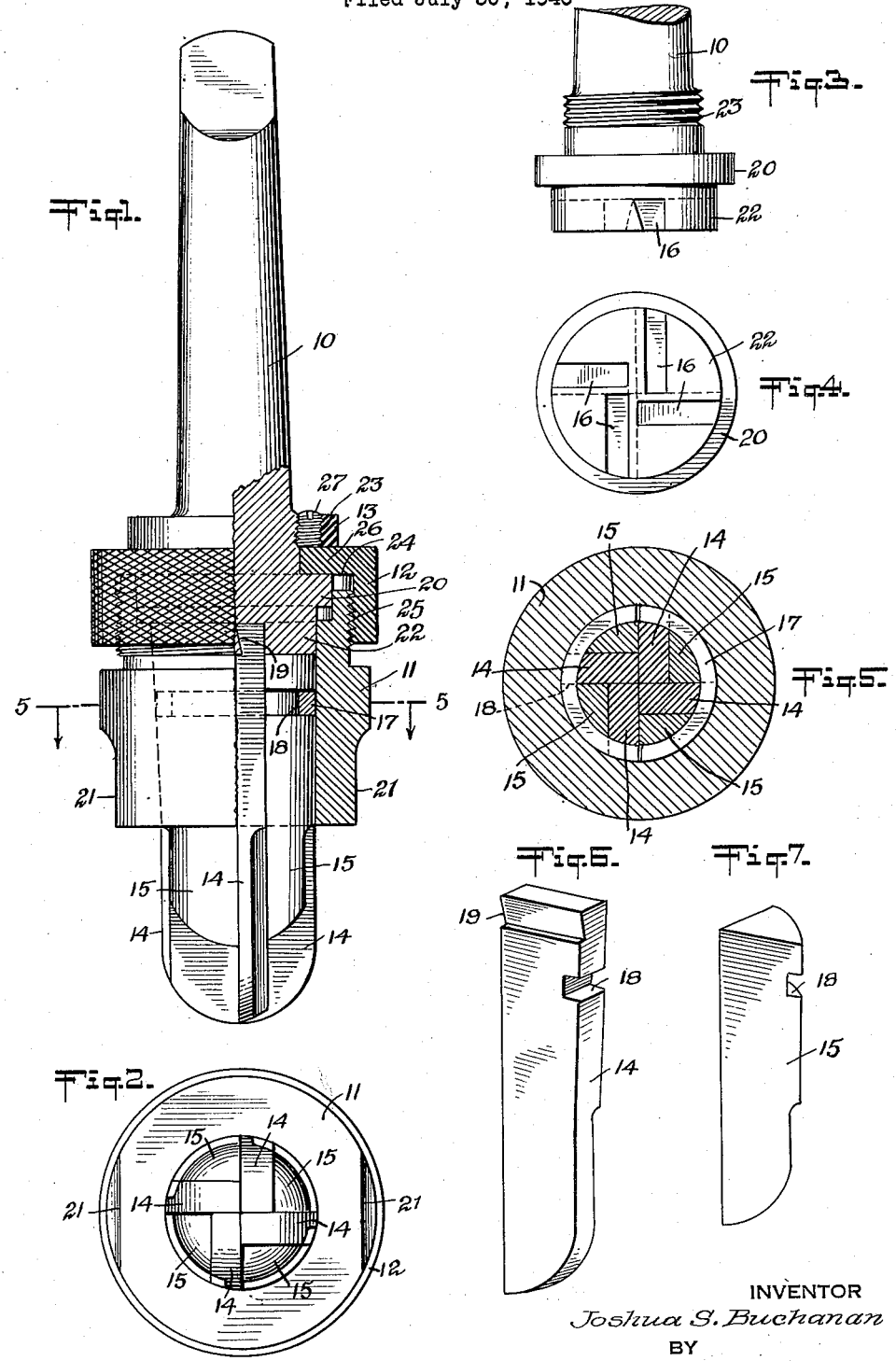
INVENTOR
Joshua S. Buchanan
BY
ATTORNEYS Patented Aug. 8, 1950

2,517,970

UNITED STATES PATENT OFFICE 2,517,970

REAMING TOOL

Joshua S. Buchanan, Salt Lake City, Utah

Application July 30, 1946, Serial No. 687,067

2 Claims. (Cl. 77—75)

My invention relates to reaming tools and more particularly to a new type of tool that has many advantages over the ordinary conventional reamer.

The principal advantage of my invention over the conventional reaming tool is that new blades can be substituted when they are worn and it is not necessary to throw away the entire unit.

Another advantage is that the blades can be reground again and again until the entire blade has been used.

Another feature of my invention is the manner in which the blades are mounted and held in the chuck assembly. Through the use of fillers and by having the blades meet at a common center I assure perfect alignment of the blades and also assure positive rotation and direct pressure off the shank on to the blades.

Furthermore the composite assembly of the blades and filler segments forms a complete diameter unit and the filler segments are extended almost to the cutting edge of the blades to assure support and rigidity to the blades.

Another advantage of my invention is its versatility in that merely by changing the shapes of the cutting blades various types of end shapes in bores may be obtained. Its advantage over the conventional milling or reaming tool is obvious for in using those tools it would be necessary to use a complete new tool for each of the required shapes.

A further advantage is that my invention can be utilized in outside reaming and combination inside and outside reaming.

Another advantage is that due to the uniform shape of the cutting blades it is a simple matter to resharpen them, which is not the case in the conventional reamer where resharpening of the blades is an involved procedure.

Further advantages and unique features of my invention will be apparent as we proceed with the description.

Referring to the drawings:

Fig. 1 is a side elevation of my reaming tool partially in section.

Fig. 2 is a bottom plan view of Fig. 1.

Fig. 3 is a side elevation of the lower portion of the shank.

Fig. 4 is a bottom plan view of Fig. 3.

Fig. 5 is a cross section view of Fig. 1 on line 5—5.

Fig. 6 is a perspective view of a cutting blade.

Fig. 7 is a perspective view of a filler segment.

Fig. 1 shows a side elevation of my reaming tool consisting of a shank 10 with the conventional arrangement at the upper end for attachment to the machine. The opposite end of the shank 10 terminates in a base 22 which is equipped with grooves 16. The grooves 16 are shaped to correspond with the groove portion 19 of the cutting blades 14. The grooves 16 as shown in Fig. 4 extend to the center line of the shank and the number can be varied in accordance with the desired number of cutting blades. Directly above the base 22 is a collar 20 and above the collar 20 the shank is threaded at 23 to receive the locking nut 13.

As shown in Fig. 6 the cutting blades 14 are rectangular in cross section having a slot 18 near their upper end. In addition the cutting blades are tapered to assure a perfect fit in the chuck 11 which is also tapered.

As shown in Fig. 7 the filler segments 15 are shaped to fill up the area between adjoining blades and they are also tapered to assure a tight fit in the chuck 11. The filler segments 15 are also equipped with a slot 18 that corresponds with and is of the same dimensions as the slot on the cutting blade 14.

In order that there be perfect alignment of the blades in the chuck 11, a split collar 17 is placed into slots 18 of the blades and filler segments. It should be noted that the filler segments 15 are somewhat shorter in length than the cutting blades and as shown in Fig. 1 their lower edges do not extend down to the cutting edge of the blades 14. However, by extending with the cutting blades 14 for the major portion of their length, the filler segments furnish support and rigidity to the blades, which is of great importance during reaming operations. Unlike the upper portion of the cutting blades 14 the upper portion of the filler segments are not grooved and their upper surface merely fits flush against the base 22 of the shank 10.

As shown in Fig. 2 the cutting blades 14 secure additional support from the fact that they meet at a common center by having the edges abutting against one another. There is no looseness or play in the blade assembly and a tight fit in the chuck is assured. Also due to the absence of any play positive rotation and direct pressure from the shank will be passed on to the blades.

To assemble the reaming tool the cutting blades 14 are fitted into the slots 16 in the base 22 of the shank 10. The filler segments 15 are then placed between the blades and the entire unit is held in alignment through the utilization of the split collar 17 which fits in slots 18 of both the blades and filler segments. The entire assembly consisting of the shank 10, cutting blades 14, filler segments 15 and split collar 17 is then placed in the chuck 11. As previously stated the inner bore of the chuck 11 is tapered to correspond with the tapered sides of the blades and filler segments. The upper portion of the chuck 11 is threaded at 25 on the outside to receive outside cap 12. The outside cap 12 has a hole in the center which slips over the shank 10 allowing the lower surface 24 of the flange 26 of the cap 12 to come in contact with the upper surface of collar 20 on the shank 10. The cap 12 is screwed down until there is a tight fit and the blade unit is firmly held in the chuck 11. To facilitate the tightening down of the cap 12 there are milled sides 21 on the chuck 11 so that it may be held in a vise or clamp during this operation. After the cap 12 has been secured, the lock nut 13 is slipped over the shank and tightened down on the cap 12 on threads 23. In order to prevent the nut 13 from turning a headless screw 27 is threaded between the shank and the nut 13.

It should be noted that my invention is not limited to operation with any specific number of blades and that minor changes may be incorporated so that any number of blades that may be desired can be utilized.

Although I have shown my invention in its preferred form it should be realized that changes may be made without deviating from the principle of my invention.

I claim:

1. A reamer comprising an upper shank with a base at its lower end, the bottom face of the base provided with a series of spaced slots extending inwardly from the outer edges thereof, a series of cutting blades having upper ends adapted to be disposed in said slots, the slots so related as to dispose corresponding rear longitudinal edges along a common center line and the inner adjacent faces of the blades in abutting relation along their length, and filler segments of shorter length than the blades and disposed between the blades with their upper ends bearing against the bottom face of the base and means peripherally encircling the upper portions of the blades and segments to hold them together, the outer faces of said segments and blades being tapered, the upper ends of the blades and the slots in the base also being tapered to latch the blades therein, a hollow chuck having inner tapered walls and adapted to receive the series of blades and segments and means on the shank engaging the chuck to tighten the shank and related blades and segments in the chuck.

2. A reamer comprising an upper shank with a base at its lower end, the bottom face of the base provided with a series of spaced slots extending inwardly from the outer edges thereof, a series of cutting blades having upper ends adapted to be disposed in said slots, the slots so related as to dispose corresponding rear longitudinal edges along a common center line and the inner adjacent faces of the blades in abutting relation along their length, the blades and segments in their upper ends formed with aligned peripheral slots and a split ring in said slots to hold blades and segments together, the outer faces of said segments and blades being tapered, the upper ends of the blades and the slots in the base also being tapered to latch the blades therein, a hollow chuck having inner tapered walls and adapted to receive the series of blades and segments, and means on the shank engaging the chuck to tighten the shank and related blades and segments in the chuck.

JOSHUA S. BUCHANAN.

REFERENCES CITED

The following references are of record in the file of this patent:

UNITED STATES PATENTS

| Number | Name | Date |
|---|---|---|
| 603,748 | Thau | May 10, 1898 |
| 1,204,994 | Kendall | Nov. 14, 1916 |
| 1,325,556 | Countryman | Dec. 23, 1919 |
| 1,377,495 | Logan | May 10, 1921 |
| 1,479,124 | Winkley | Jan. 1, 1924 |
| 1,499,416 | Stech | July 1, 1924 |
| 1,596,063 | Miller | Aug. 17, 1926 |
| 1,883,285 | Zimmerman | Oct. 18, 1932 |
| 2,188,584 | Tyne | Jan. 30, 1940 |
| 2,351,491 | Connell | June 13, 1944 |